(12) United States Patent
Beaman et al.

(10) Patent No.: US 7,620,753 B1
(45) Date of Patent: Nov. 17, 2009

(54) LOCKLESS ACCESS TO A RING BUFFER

(75) Inventors: Alexander B. Beaman, San Jose, CA (US); Daniel Steinberg, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 610 days.

(21) Appl. No.: 11/083,671

(22) Filed: Mar. 17, 2005

(51) Int. Cl.
G06F 3/00 (2006.01)
(52) U.S. Cl. .......................................... 710/56; 710/52
(58) Field of Classification Search ................... 712/52; 710/57
See application file for complete search history.

(56) References Cited

U.S. PATENT DOCUMENTS

| 5,664,226 | A | 9/1997 | Czako et al. ................. 395/872 |
| 6,862,635 | B1* | 3/2005 | Alverson et al. .............. 710/52 |
| 2001/0008535 | A1 | 7/2001 | Lanigan ....................... 370/487 |
| 2002/0081098 | A1 | 6/2002 | Scally .......................... 386/95 |
| 2005/0201398 | A1* | 9/2005 | Naik et al. ................... 370/412 |
| 2005/0240745 | A1* | 10/2005 | Iyer et al. .................... 711/167 |
| 2005/0288805 | A1* | 12/2005 | Moore et al. ................. 700/94 |
| 2006/0074637 | A1 | 4/2006 | Berreth |

FOREIGN PATENT DOCUMENTS

| EP | 0 830 026 A2 | 3/1998 |
| EP | 0830026 A2 | 3/1998 |
| EP | 1 143 719 A2 | 10/2001 |
| EP | 1143719 A2 | 10/2001 |
| WO | WO 01/26374 A1 | 4/2001 |

OTHER PUBLICATIONS

David Clifton, "pipe.c", 2003, p. 6, http://www.codelode.com/Kernel/kla2pipec.html.*
"Notification of Transmittal of the International Search Report and the Written Opinion of the International Searching Authority, or the Declaration" as received in related PCT case, International application No. PCT/US2005/02139, dated Mar. 29, 2006.
Hughes, M., "Turning streams inside out, Part 2: Optimizing internal Java I/O" XP-002348074 (2002), 17 pages.
Hughes, M., "Turning streams inside out, Part 2: Optimizing internal Java I/O", XP-002348074, retrieved from the Internet Jun. 10, 2005: <URL:http://www-128.ibm.com/developerworks/jaca/library/j-io2/?t=egrL296&p=streams2> 17 pages.
Notification Concerning Transmittal of Copy of International Preliminary Report on Patentability (Chapter 1 of the Patent Cooperation Treaty) received in International application No. PCT/US2005/02139.
Current claims of PCT/US05/20139.

* cited by examiner

*Primary Examiner*—Henry W. H. Tsai
*Assistant Examiner*—John B Roche
(74) *Attorney, Agent, or Firm*—Hickman Palermo Truong & Becker LLP; Adam C. Stone

(57) ABSTRACT

A reader and writer access a ring buffer without using a locking mechanism, thereby avoiding any delays attendant to using a locking mechanism when performing read operations to supply the reader with data from the ring buffer. Other measures are used to reduce delayed performance of read operations. If data requested by a reader is not available in the ring buffer, rather than waiting until the data becomes available, substitute data not from the ring buffer is provided instead. The ring buffer's size may be dynamically increased or decreased to improve performance of read and write operations and/or to conserve computer resources.

40 Claims, 7 Drawing Sheets

LOCKLESS ACCESS TO A RING BUFFER

FIELD OF THE INVENTION

The present invention relates to communicating data using ring buffers in a computer system or electronic device.

BACKGROUND OF THE INVENTION

Ring buffers are powerful mechanisms for communicating data. A writer writes data to the ring buffer and a reader reads data from the ring buffer. A writer initially writes data at the beginning of the buffer. When the writer fills the buffer, the writer begins writing to the buffer again at the beginning. The writer feeds data to the reader by writing at a point in the buffer that is ahead from the point where the reader is reading from the buffer.

One important feature of a ring buffer is that data is read from the buffer in the same order it is written. Thus, ring buffers are very useful for communicating data associated with an order in that order. This feature is particularly useful for real-time applications, such as processing and communicating of digital audio/video data ("audio/video data").

A ring buffer is used to communicate audio/video from a provider of audio/video data to a user of audio/video data. An example of such a provider and a user are an audio/video preparation thread and audio/video IO thread on a computer system or electronic device. The audio/video preparation thread is the writer and the audio/video IO thread is the reader. The audio/video preparation thread prepares audio/video data from an audio file, decoding, decompressing, and formatting the data. The prepared audio is ordered according to time. The audio/video data is written to a ring buffer in the time order, where it is read by the audio/video thread in the time order. The audio/video IO thread may be, for example, a thread executing the device driver of an audio or video card. The audio IO thread receives the prepared audio/video data and transmits the data to the card to be played.

In some contexts in which a ring buffer is used, it is important to avoid delaying the reading of a ring buffer by the reader. For example, if the reader is an audio/video IO thread, delaying or impairing the execution of the audio/video IO thread can impact playback quality. To avoid such delay, a reader is assigned a higher execution priority relative to other threads, including a thread executing as a writer. Assigning a higher execution priority gives the thread a greater proportion of CPU time and processing.

Unfortunately, assigning a higher execution priority to a reader is not a panacea. Delays to the reader may nevertheless occur for a variety of reasons. For example, one form of delay stems from the fact that a reader and writer coordinate access to a ring buffer using a locking mechanism. A locking mechanism governs access to a resource and data structures using another set of data structures, such as semaphores, mutexes, or latches. Using a locking mechanism to access a ring buffer inherently entails a layer of overhead. Further, locking contention can cause the writer and reader to block and delay each other.

Specifically, when a writer writes to the ring buffer, it acquires an exclusive lock from the locking mechanism, preventing the reader from accessing the ring buffer. Thus, even when the writer's execution is pre-empted to execute the higher priority reader, the reader is nevertheless blocked by the writer's exclusive lock. In effect, the reader is subordinated to a lower execution priority than that of the writer. Furthermore, because the reader has a higher execution priority, it is being allocated more execution time. Consequently, execution time is shifted away from threads with lower execution priority to a reader that is simply waiting around to become unblocked.

Also, assigning a higher execution priority to the reader increases the likelihood that the reader catches up to the writer. When using a ring buffer, the reader is not allowed to read ahead of the writer and must wait for the writer to "get ahead". Thus, the reader is delayed when it catches up to the writer and must wait until the writer gets ahead.

Based on the foregoing, there is a clear need for ways to avoid delay of ring buffer readers, particularly those that are given higher execution priority.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for lockless access to a ring buffer is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques that manage concurrent access to a ring buffer by a reader and writer. The techniques do not use a locking mechanism, thereby avoiding any delays attendant to using a locking mechanism when performing read operations to supply the reader with data from the ring buffer. The techniques may use other measures and strategies to reduce delays to performing read operations. If data requested by a reader is not available in the ring buffer, rather than waiting until the data becomes available, substitute data not from the ring buffer is provided instead. The ring buffer's size may be dynamically increased or decreased to improve performance of read or write operations and/or to conserve computer resources.

For purposes of illustrating, ring buffer features and strategies are illustrated using an audio/video system. However, an embodiment of present invention is not limited communicating audio/video data.

Figure 1:
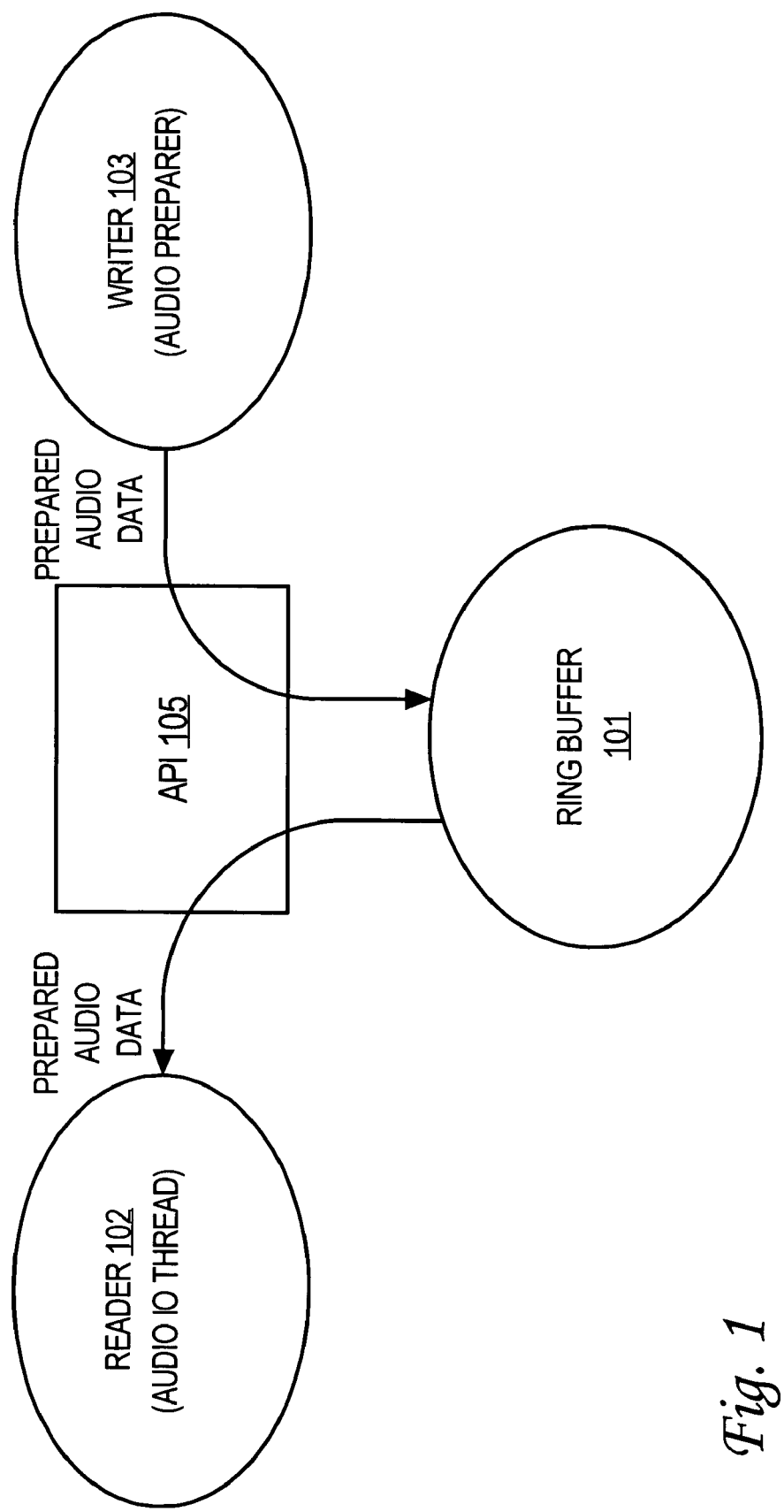
FIG. 1 is a block diagram depicting an overview of a ring buffer used by a reader and writer according to an embodiment of the present invention.

FIG. 1 shows a reader and writer of a ring buffer used to illustrate an embodiment of the present invention. Referring to FIG. 1, writer 103 and reader 102 are separate threads of execution executing on a computer system. Reader 102 and writer 103 may be executing an application, such as an audio/video playback engine. In this case, writer 103 is an audio/video preparer. An audio/video preparer generates prepared audio/video data and stores the audio/video data in ring buffer 101. Prepared audio/video data is audio/video data that has been formatted into a format recognized by a user of the audio/video data, such as an audio device (e.g. sound card). The generation of prepared audio/video data includes, for example, reading data from an audio file, and decoding, decompressing, and formatting the data. Reader 102 is a thread executing the device driver of an audio or video device, such as a sound or video card. Reader 102 reads data from ring buffer 101 and transmits the data to the device.

Writer 103 and reader 102 invoke API ("application programmer interface") 105 to access ring buffer 101. An API is a set of routines (e.g. procedures, function modules) that provide access to a particular resource or service on a computer system. API 105 manages access to ring buffer 101. To get prepared data from ring buffer 101, reader 102 makes a "read request" for data by invoking a function of API 105. Similarly, to write data to ring buffer 101, writer 103 makes a "write request" by invoking a function of API 105.

The term read operation refers to the operations undertaken to read data from ring buffer 101. An example of a read operation is the execution of a function of API 105 that is invoked to make a read request. The term write operation refers to the operations undertaken to write data from ring buffer 101. An example of a write operation is the execution of a function that is invoked to make a write request.

It may be important that reader 102 not be delayed when reading data. For example, it is important for effective processing of audio/video data by an audio/video device that its driver not be delayed in getting audio/video data from ring buffer. To this end, several measures are followed. Reader 102 is assigned a higher execution priority than writer 103. Furthermore, API 105 provides read access to ring buffer 101 without having to use a lock mechanism.

Illustrative Ring Buffer

Figure 2:
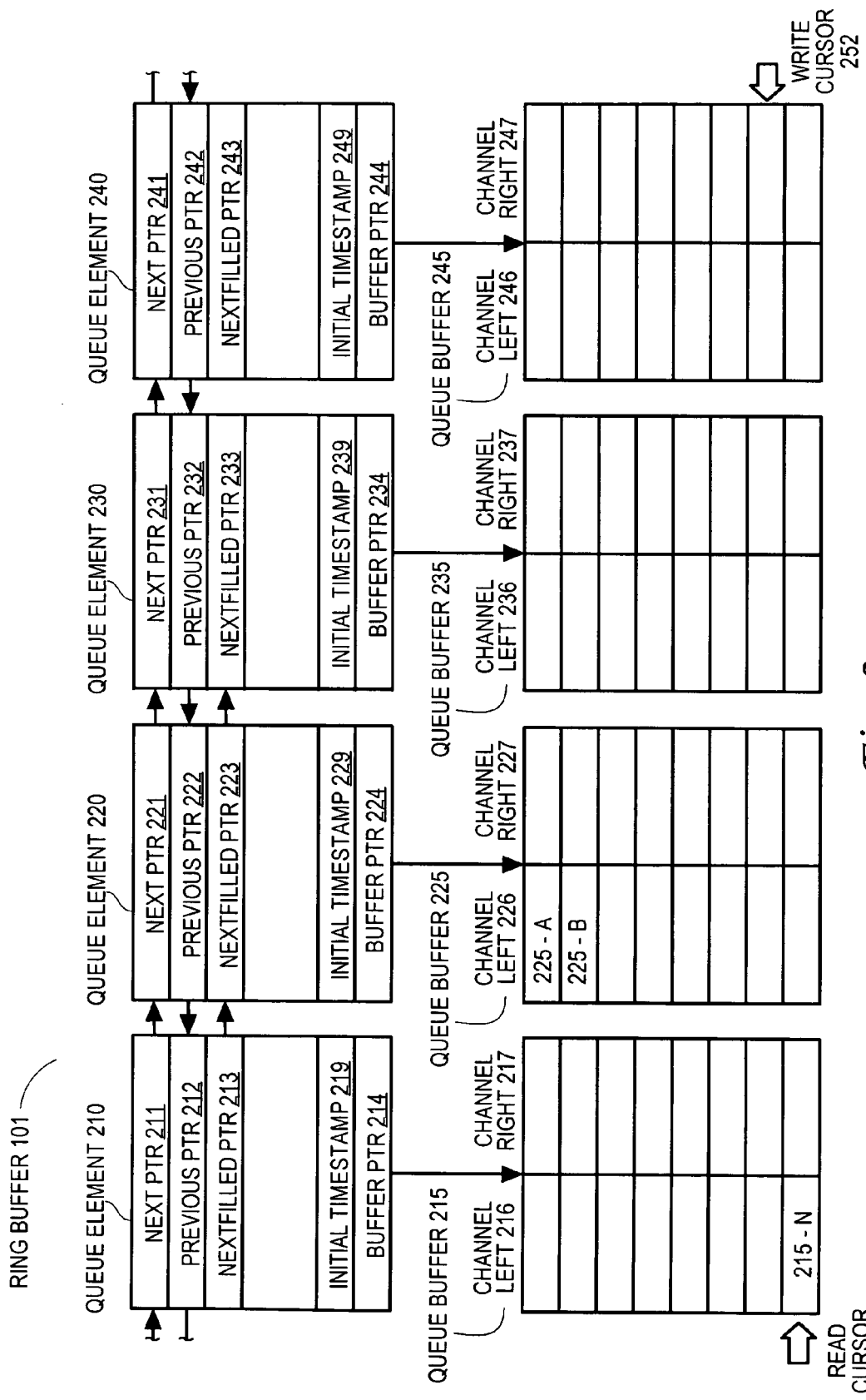
FIG. 2 is a block diagram depicting a ring buffer according to an embodiment of the present invention.

FIG. 2 shows ring buffer 101, a ring buffer according to an embodiment of the present invention. Ring buffer 101 includes queue of doubly linked queue elements 210, 220, 230, and 240, which are linked by a set of pointers contained in each of the queue elements.

The term queue refers to any data structure with ordered elements or entries. The set of pointers in each of queue elements 210, 220, 230 and 240 include a pointer to the next queue element in the circular order of ring buffer 101 and a pointer to the previous queue element in the circular order. For example, queue element 210 contains next pointer 211, which points to the next queue element in the circular order, queue element 220, and contains previous pointer 212, which points to the previous element in the circular order, queue element 240. Similarly, queue element 220 includes next pointer 221 and previous pointer 222, which point to queue elements 210 and 230, respectively; queue element 230 includes next pointer 231 and previous pointer 232, which point to queue elements 220 and 240, respectively; queue element 240 includes next pointer 241 and previous pointer 242, which point to queue elements 230 and 210, respectively.

The term pointer, as used herein, is a data structure that holds a pointer value. A pointer value is a value that specifies the location of a data structure in memory, including a virtual memory. A pointer may also contain a value indicating that the pointer does not point to any particular location. Such a value is referred to herein as the NULL value. Pointers that hold the NULL value are referred to herein as null pointers. When a pointer holds a pointer value for a data structure, the pointer is referred to as pointing to that data structure. A pointer to a data structure may not reference the data structure directly. Rather, the pointer may point to a handle that holds a pointer the data structure or even another handle.

Each queue element includes a pointer to a queue buffer which holds data. Queue element 210 includes buffer pointer 214, which points to queue buffer 215. Similarly, queue elements 220, 230, and 240 include buffer pointer 224, buffer pointer 234, and buffer pointer 244, respectively, which point to queue buffers 225, 235, and 245, respectively.

Each of queue buffers 215, 225, 235, and 245 contain an ordered set of buffer elements. The ordinal position of a buffer element in a queue buffer of ring buffer 101 is based on the ordinal position of the queue buffer within ring buffer 101 and the ordinal position of the buffer element in the queue buffer.

For example, in queue buffer 225, each row corresponds to a buffer element in the form of a frame. A frame represents one or more channels of sound for a period of time, and includes a sample for each channel of the frame. A sample is audio/video data for a channel for the period of time. Columns channel left 216 and right 217 correspond to samples for a channel. For each frame, channel left 216 corresponds to the left channel of a stereo recording and channel right 217 corresponds to the right channel of a stereo recording. Similarly, queue buffer 225 contains frames with multiple channels left 226 and right 227, buffer 235 contains frames with multiple channels left 236 and right 237, and buffer 245 contains frames with multiple channels left 246 and right 247.

In ring buffer 101, a given frame is immediately preceded by the frame representing the period of time immediately preceding that of the given frame, and is immediately followed by the frame representing the period of time immediately following that of the given frame. For example, frame 225-B is immediately preceded by frame 225-A, which represents the period of time immediately preceding that of the frame 225-B; frame 225-A is immediately preceded by frame 225-N, which represents the period of time immediately preceding that of the frame 225-A. Frame 225-A is immediately followed by frame 225-B, which represents the period of time immediately following that of the frame 225-A; frame 215-N is immediately followed by frame 225-A, which represents the period of time immediately preceding that of the frame 215-N.

Finally, each of queue elements 210, 220, 230, and 240 contain a nextfilled pointer, which may point to the next queue element in the circular order, but only when the next queue element's queue buffer may be read by reader 102 i.e. after writer 103 has been began and completed filling of the queue buffer with data. Nextfilled pointer 213 in queue element 210 points to queue element 220, and thus queue buffer 225 may be read by reader 102. Nextfilled pointer 223 in queue element 220 points to queue element 230, and thus queue buffer 235 may be read by reader 102.

Queue elements may contain other fields and data structures not depicted in FIG. 2. For example, a queue element may contain a filled flag indicating whether or not the queue buffer of the queue element has been filled. A queue buffer is referred to as having been filled after writer 103 completes writing data to the queue buffer and reader 102 has not read any of the data from the queue buffer.

Read cursor 251 represents the last point (i.e. buffer element) from which data was supplied to reader 102 in response to a read request from reader 102. In subsequent read requests, data can only be supplied from a point beyond read cursor 251 but not behind. Write cursor 252 represents the last point (i.e. buffer element) to which data was written in response to write a request from writer 103.

For convenience of expression, when read cursor 251 is within a queue buffer of a queue element, read cursor 251 is referred to herein as being at the queue element and the queue element is referred to as being the current queue element with respect to reader 102. When write cursor 252 is within the queue buffer of a queue element, write cursor 252 is referred to as being at the queue element and the queue element is referred to as being the current queue element with respect to writer 103. In FIG. 2, with respect to read cursor 251, it is at queue element 210, which is the current queue element. With respect to write cursor 252, it is at queue element 240, which is the current queue element.

Also for convenience of expression, when reader 102 is reading data from the queue buffer of a queue element, reader 102 is referred to as reading data from that queue element. Similarly, when writer 103 is writing to or filling a queue buffer of a queue element, writer 103 is referred to as writing to the queue element.

Lockless Access to a Ring Buffer

Reader 102 and writer 103 may concurrently access data in ring buffer 101. This is achieved by providing, without use of a locking mechanism, exclusive access to a queue buffer in ring buffer 101 to reader 102 when reader 102 commences and until it finishes reading the audio queue, and by providing, without use of a locking mechanism, exclusive access to a queue buffer in ring buffer 101 to writer 103 when writer 103 commences and until it finishes writing to the audio queue. The current queue element of reader 102 is never the current queue element of writer 103. While reader 102 is reading data from its current queue element, writer 103 may be writing data to a queue element ahead of the current queue element. Reader 102 never passes writer 103's position in ring buffer 101.

This type of access is achieved through the way the nextfilled pointers are used by reader 102 and writer 103 when advancing to a queue element. With respect to reader 102, the term advance refers to operations performed by reader 102 to begin accessing data from the next queue element when reader 102 has completed reading data from the current queue element. With respect to writer 103, the term advance refers to operations performed by writer 103 to begin accessing data from the next queue element when writer 103 has completed filling the current queue element.

Writer 103 only advances to the next queue element if the nextfilled pointer of the next queue element is set to NULL. When writer 103 advances to the next queue element, writer 103 sets the nextfilled pointer of the previous queue element to point to the current queue element, signaling to reader 102 that the latter queue element can be read.

With respect to writer 103, the nextfilled pointer acts as an indicator that the queue element is available to be written to. With respect to reader 102, the nextfilled pointer acts as both a pointer of where to advance to next and an indicator of whether the next queue element can be read by reader 102.

To advance, writer 103 examines the next pointers and previous pointers. On the other hand, reader 102 never examines the next and previous pointers to advance, only the nextfilled pointers.

When reader 102 encounters a nextfilled pointer that is NULL, there is no more data in ring buffer 101 that is available for reader 102 to read. The ring buffer is empty.

When writer 103 encounters a nextfilled pointer that points to a queue element, there is no queue element left that writer 103 can write to. The ring buffer is full.

As compared to writer 103, reader 102 has a very limited set of operations that it may perform on ring buffer 101. Reader 102 may read data, modify a queue element that reader 102 is reading from, and advance to the next filled queue element if the respective nextfilled pointer indicates that there is one.

Writer 103 has greater responsibility for manipulating ring buffer 101 to, for example, decrease or increase the number queue elements. So long as writer 103 does not interfere with any queue elements that are available to reader 102 to read, writer 103 may add, remove, and reorder queue elements, as well as write data to them.

It would be possible to shift some of this responsibility from the writer to the reader, but this strategy would require a separate lock mechanism.

Reader Action to Advance

Figure 3:
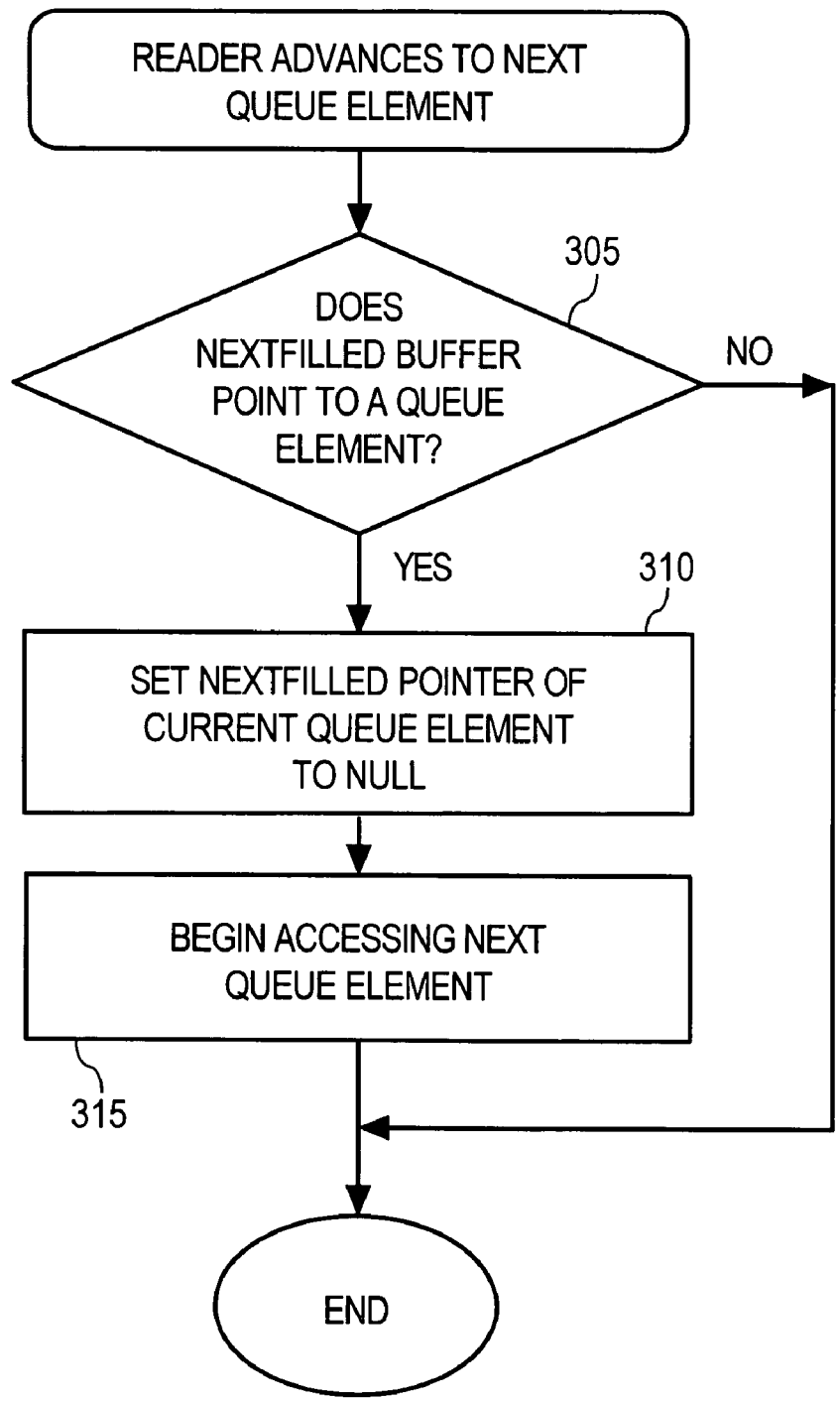
FIG. 3 is a flow chart depicting a procedure used by a ring buffer reader to advance through the ring buffer according to an embodiment of the present invention.

FIG. 3 depicts a procedure performed by a reader to advance to the next queue element according to an embodiment of the present invention. A reader advances to the next queue element when, for example, another frame needs to be read to satisfy a read request and read cursor 251 is at the last frame of a queue buffer.

The procedure is illustrated using the structures and entities depicted in FIG. 2. As shown in FIG. 2, read cursor 251 is at the end of the queue buffer 215 of queue element 210. Thus, queue element 210 is the current queue element.

Referring to FIG. 3, at step 305, reader 102 determines whether the nextfilled pointer 213 of current queue element 210 points to a queue element. If the nextfilled pointer 213 of current queue element 210 points to a queue element, then execution proceeds to step 310. Otherwise execution of the steps ends.

For purposes of illustration, nextfilled pointer 213 points to next queue element 220. Therefore, execution proceeds to step 310.

At step 310, reader 102 sets the nextfilled pointer 213 of current queue element 210 to NULL. The setting of the pointer is an atomic operation. At step 315, reader 102 begins to read data from the next queue element.

Writer Action to Advance

Figure 4:
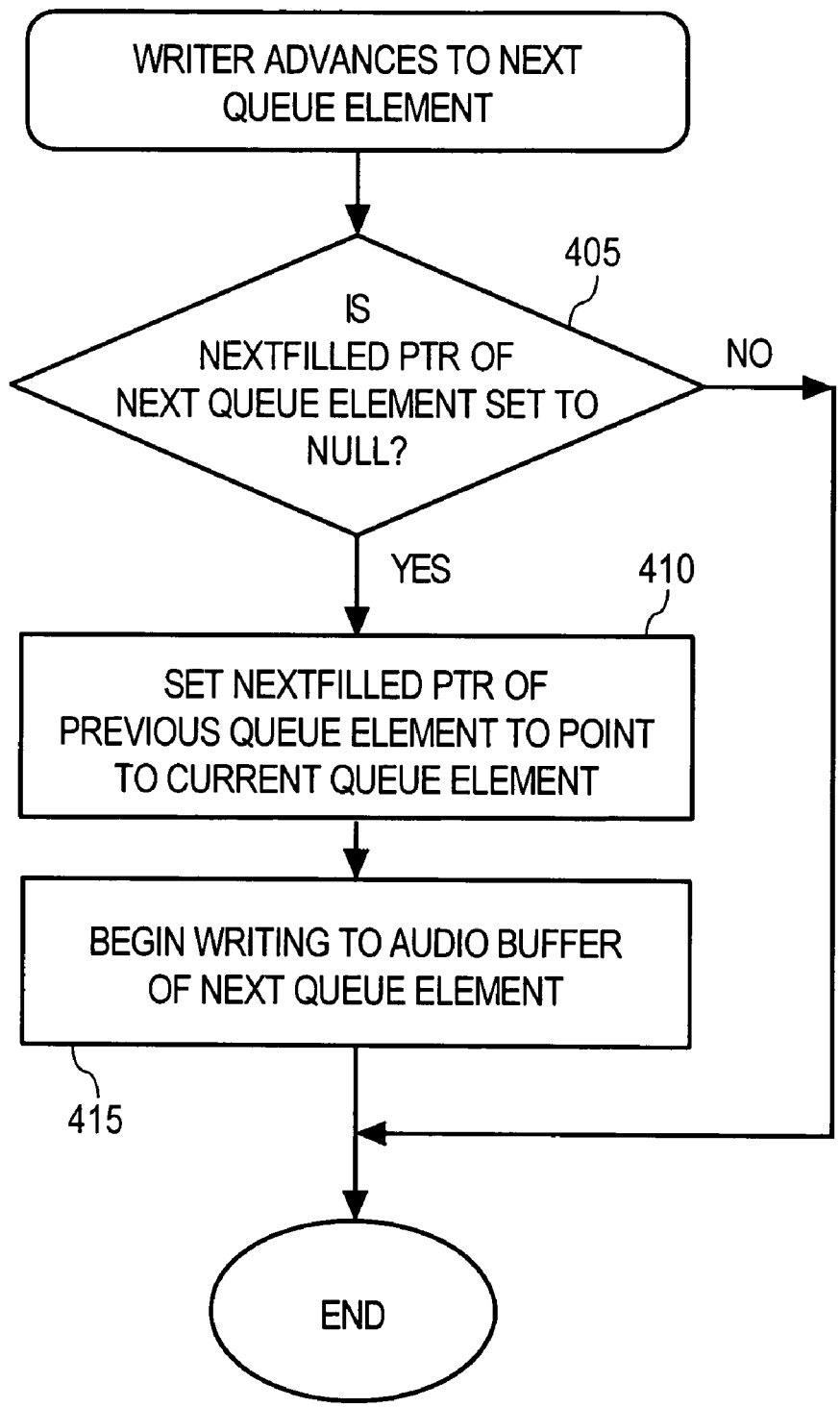
FIG. 4 is a flow chart depicting a procedure used by a ring buffer writer to advance through the ring buffer according to an embodiment of the present invention.

FIG. 4 shows a procedure performed by a writer to advance to the next queue element according to an embodiment of the present invention. A writer advances to the next queue element when, for example, another frame needs to be written to ring buffer 101 and writer cursor 252 is at the end of a queue buffer. The procedure is illustrated using the structures and entities depicted in FIG. 2. Write cursor 252 is at the end of the queue buffer 245 of queue element 240. Thus, queue element 240 is the current queue element.

Referring to FIG. 4, at step 405, writer 103 determines whether the nextfilled pointer 213 of next queue element 310 is NULL. If nextfilled pointer 213 of current queue element 210 is NULL, then execution proceeds to step 410.

If nextfilled pointer 213 of current queue element 210 is not set to NULL, then reader 102 has not completed reading the queue element. Ring buffer 101 is full. In this case, the execution of the procedure ends. Writer 103 waits and then attempts the procedure again.

For purposes of illustration, nextfilled pointer 213 is NULL. Accordingly, execution proceeds to step 410. At step 410, writer 103 sets nextfilled pointer 233 of previous queue element 230 to point to current queue element 240. The setting of the pointer is an atomic operation. Thus, reader 102 will not encounter a partially set pointer which could misdirect reader 102. At step 415, writer 103 begins writing to queue buffer 215 of next queue element 210.

Gap Between Reader and Writer Ensures Availability of Data

The rate at which reader 102 reads data from a queue buffer is referred to herein as the reader rate. The rate at which writer 103 writes data to a queue element is referred to herein as the writer rate. Preferably, the writer rate is faster than the reader rate. Thus, writer 103 can fill a number of queue elements ahead of the current queue element of reader 102. Generally, this state is desirable because it ensures data is available when requested by reader 102. Reader 102 is not delayed because data is unavailable.

The set of filled queue elements between the reader and writer is referred to herein as the gap. The number of queue elements in the gap is referred to herein as the gap size. The gap size is bounded by the number of queue elements in ring buffer 101. Specifically, the gap size can expand to the number of elements in ring buffer 101 minus one.

Dynamically Altering Number of Queue Elements

For a variety of reasons, reader and writer rates fluctuate, and the reader rate may be temporarily faster than the writer rate, allowing reader 102 to gain ground on writer 103. The gap size can shrink to zero, meaning ring buffer 101 is empty and no data in ring buffer 101 is available for reader 102. This latter situation should be avoided.

A larger gap size decreases the risk of the gap shrinking to zero, thus ensuring the availability of data while the reader rate is temporarily faster and reader 102 is gaining ground. A larger gap size is achieved by increasing the bound on the gap size; the bound is increased by increasing the number of queue elements in ring buffer 101.

The reader rate may be increased when, for example, a playback application increases the playback rate by two or four. An increased reader rate increases the chances that the gap may be insufficient to ensure availability of data for the reader when the reader and writer rates fluctuate. To increase the gap size, its bound is increased by dynamically adding a chain of queue elements. A chain of queue elements is a series of one or more doubly linked elements that are not circularly linked.

On the other hand, the gap size always being at or near the bound can be a sign that ring buffer 101 may have more queue elements than is needed to avoid reader 102 catching up to writer 103. In this situation, it may be desirable to reduce the number of queue elements to conserve resources. Such a situation may be detected by writer 103, which monitors the gap size, determining the gap size by counting the number queue elements whose filled flag indicates that the respective queue element is filled. When the situation is detected, writer 103 may dynamically remove queue elements from ring buffer 101.

Adding Queue Elements to Ring Buffer

A chain of queue elements is added to ring buffer 101 during a write operation, by inserting the chain between the current queue element and the queue element following the current queue element. To insert the chain element, the next pointer of the current queue element is set to point to the first queue element in the chain, and the previous pointer of the first queue element in the chain is set to point back to the current queue element. The next pointer of the last queue element in the chain is set to point to the former queue element that had previously followed by the current queue element, and the former queue element is set to point back to the last queue element in the chain.

The chain is inserted during a write operation. If the write operation entails advancement, the chain is inserted before the nextfilled pointer of the previous queue element is set. Inserting the chain at this point ensures that the chain is inserted before reader 102 next relies on the nextfilled pointer to advance.

Removing Queue Elements

Like the adding of queue elements, the removal of queue elements is performed during a write operation, at the same point where queue elements may be added, for similar reasons adding queue elements is performed at this point. Only queue elements immediately ahead of the current queue element of writer 103 are removed. Further, the queue elements are not removed if the reader has not advanced beyond them.

Figure 5:
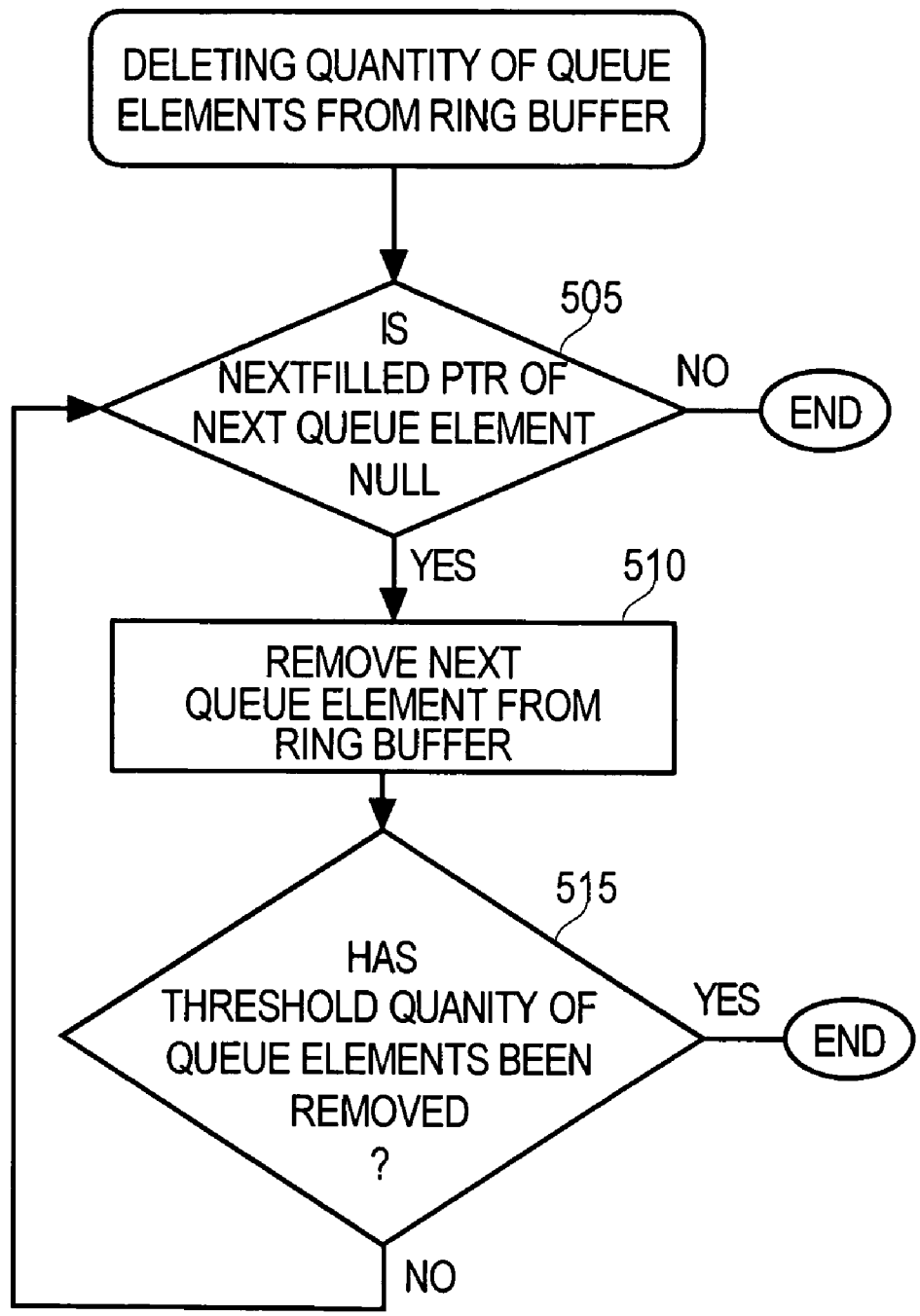
FIG. 5 is a flow chart depicting a procedure to dynamically reduce the size of a ring buffer according to an embodiment of the present invention.

FIG. 5 shows a procedure for removing a threshold number of queue elements from ring buffer 101. When the procedure is executed, the procedure may remove less than the threshold number of queue elements. The procedure may have to be invoked iteratively to remove the unfilled queue elements the reader leaves as it advances through ring buffer 101.

Referring to FIG. 5, at step 505, writer 103 determines whether the nextfilled pointer of the next queue element is set to NULL. If the nextfilled pointer of the next queue element is not set to NULL, execution of the procedure ends. Reader 102 is still at the next queue element. If the nextfilled pointer of the next queue element is set to NULL, then execution proceeds to step 510.

At step 510, the next queue element is removed from the queue element. This operation entails modifying the pointers of the current queue element and the next queue element's following queue element so that the latter now becomes the next queue element of the current queue element.

At step 515, writer 103 determines whether the threshold quantity of queue elements has been removed. If the threshold quantity of queue elements has been removed, then execution loops back to step 505. Otherwise execution of the procedure ends.

Denoting Ordinal Position Information

Buffer elements may be tagged or marked, explicitly or implicitly, with ordinal information, such as time information. For example, the ordinal position associated with each frame in a queue buffer in ring buffer 101 is time information represented by a timestamp.

Figure 6:
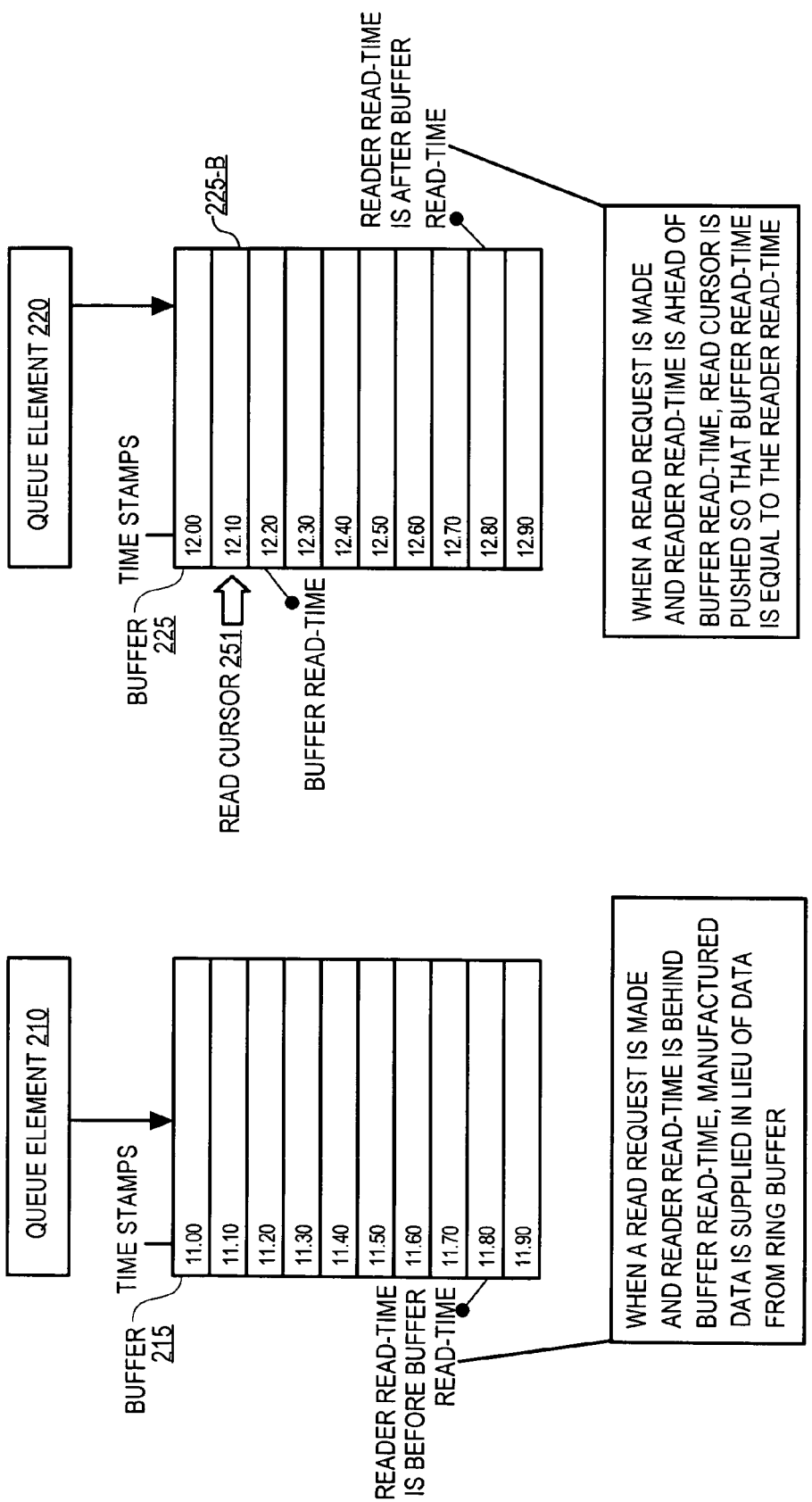
FIG. 6 is a block diagram illustrating scenarios in which time disparities exist between the ring buffer and reader.

FIG. 6 shows timestamps associated with queue buffers 215 and 225. Queue buffer 215 includes ten frames that are associated with timestamps 11.00, 11.10, 11.20, 11.30, 11.40, 11.50, 11.60, 11.70, 11.80, and 11.90, respectively. Queue buffer 225 includes ten frames that are associated with timestamps 12.00, 12.10, 12.20, 12.30, 12.40, 12.50, 12.60, 12.70, 12.80, and 12.90, respectively.

Timestamps can be represented in various ways. In ring buffer 101, the time stamp of the frame in a queue buffer is represented based, in part, on a field in the buffer's respective queue element that holds the timestamp value for the initial frame of the queue buffer. Queue elements 210, 220, 230, and 240 include initial timestamp fields 219, 229, 239, and 249, respectively (see FIG. 2). The value of initial timestamp fields 219 and 229 is 11.00 and 12.00, respectively.

The timestamp of a frame following the initial frame in a queue buffer can be calculated based on the timestamp of the initial frame, the relative ordinal position of the frame in the queue buffer, and the duration of the frames. For example, assuming the duration of a frame is 0.10, the timestamp of frame 225-B, the second frame in queue buffer 225, is calculated as 12.10.

Alternately, a timestamp value can be stored in the frame.

Handling a Read Request that Cannot be Completely Satisfied

When reader 102 requests data from ring buffer 101, the data requested can be specified by specifying an amount of data and the ordinal position of the data. For example, data requested may be specified by specifying a number of frames and/or a period of time that data requested should begin at and/or span.

In some cases, some or all the data requested may not be in ring buffer 101. In this case, an error code can be returned to the reader to indicate that there is no data available in the ring buffer. Alternatively, manufactured data is supplied in lieu of the data that cannot be supplied. Manufactured data is data not from ring buffer 101. The form of the manufactured data depends on the type of data stored in ring buffer 101. For example, manufactured data could be that which corresponds to silence in the case of audio data or to blank video in the case of video data. Returning a complete amount of requested data, even if it consists partly or entirely of manufactured data, enables an immediate response to a read request and allows reader 102 to continue without undue delay.

Buffer and Reader Read-Position or Read-Time

As mentioned previously, in response to a read request, data from ring buffer 101 is returned to reader 102 only from a buffer element ahead of read cursor 251. Thus, in ring buffer 101, the next available frame that is available is either a frame from the queue buffer of the current queue element or the next queue element. For example, the next available frame that can be supplied to reader 102, based on the current position of read cursor 251 (see FIG. 6), is the frame with timestamp 12.20. If read cursor 251 were instead at the frame with timestamp 11.90, then the next available frame that could be supplied would be the frame associated with timestamp 12.00.

The ordinal position of the data next available to a reader in ring buffer 101 is referred to as the buffer read-position. Because the audio/video data stored in ring buffer 101 is ordered by time, the buffer read-position is also referred to herein as the buffer read-time. Based on FIG. 6, the buffer read-time is 12.20 because read cursor 251 is at the frame with timestamp 12.10, frame 225-B, and the next frame to be read is the frame associated with timestamp 12.20.

Reader 102 may track the ordinal position of data it has been supplied and the ordinal position of data it expects to be supplied in the next read operation. When reader 102 requests data, it can specify an expected or requested ordinal position, referred to herein as the reader read-position. Because the audio/video data stored in ring buffer 101 is ordered by time, the reader read-position is also referred to herein as the reader read-time.

The reader read-time is the initial timestamp the returned data requested should have. Under preferable operating conditions, the reader read-time is the same as the buffer read-time. Under these conditions, the data requested by reader 102 is simply read from the next available frame, i.e. beginning at the frame just beyond read cursor 251. In FIG. 6, when reader 102 requests data, the reader read-time is 12.20, and is thus equal to the buffer read-time of 12.20. Read cursor 251 is at the frame associated with timestamp 12.10, frame 225-B. Data requested by reader 102 is then read beginning at the frame just beyond read cursor 251, the frame associated with timestamp 12.20.

Handling Reader and Buffer Ordinal Position Disparities

For various reasons, disparities between the reader read-position and buffer read-position occur. For example, the reader read-time may fall behind the buffer read-time or may advance ahead of the buffer read-time.

If the reader read-position is behind the buffer read-position, then some or all the data requested is at or behind read cursor 251. For example, if the reader read-time is before the buffer read-time, then some or all the data requested is at or behind read cursor 251. In fact, the data may not be in ring buffer 101 at all because the data may have been overwritten by writer 103. In this case, than some or all the data supplied to reader 102 is manufactured data.

For example, reader 102 requests 5 frames and specifies a reader read-time of 11.80, which is before the buffer read-time of 12.20. In response, five frames of audio/video data are provided—three frames worth of manufactured data, and the two frames associated with time stamps 12.20 and 12.30, which are read and supplied to reader 102.

Note that read cursor 251 is moved to the frame associated with timestamp 12.30, and the buffer read-time becomes 12.40. The next read request from reader 102 should have a reader read-time of 12.40. In this way, the buffer read-time and reader read-time have become synchronized.

If the reader read-position is ahead of the buffer read-position, then read cursor 251 is shifted forward to the position within ring buffer 101 that corresponds to the buffer read-position being equal to the reader read-position. Data is then read and supplied beginning just beyond read cursor 251. Moving read cursor 251 forward in this manner is referred to as a cursor push operation.

For example, when a read request is made and the reader read-time is after the buffer read-time, then read cursor 251 is pushed ahead to a position within ring buffer 101 that corresponds to the buffer read-time being equal to the reader read-time, and data is then read and supplied beginning just beyond read cursor 251. To illustrate, reader 102 requests 5 frames and specifies a reader read-time of 12.80, which is after the buffer read-time of 12.20. In response, read cursor 251 is pushed to the frame with timestamp 12.70, which corresponds to a buffer read-time of 12.80. Five frames are read from ring buffer 101 beginning with the frame with timestamp 12.80.

When data is manufactured in response to a request for data that could not be supplied from ring buffer 101, and writer 103 subsequently adds the requested data to ring buffer 101, it is important that requested data corresponding to that which has already been manufactured be discarded. This function is provided by the cursor push operation.

For example, the following operations occur in the following order:

1. Reader 102 asks for N samples of data with timestamp T and ring buffer 101 is empty. Thus, N frames of manufactured data for time T are supplied to reader 102. Read cursor 251 is and remains at the frame corresponding to T−1.

2. Writer 103 adds 2*N samples of data corresponding to timestamp T to ring buffer 101.

3. Reader 102 requests N frames of data for time T+N.

If data is supplied simply based on the current position of read cursor 251, N frames of data for time T is supplied. Reader 102 is thus being supplied data for a time period for which reader 102 has already been supplied, i.e. data that has already expired.

However, the cursor push operation causes the data supplied to reader 102 to correspond to the reader read-time. Thus, in the current example, when reader 102 requests N frames, it specifies a reader read-time of T+N. The read cursor, which is at T−1, is pushed to a position where the buffer read-time corresponds to timestamp T+N. The data subsequently supplied to reader 102 from ring buffer 101 will thus correspond to timestamp T+N.

Embodiments of the present invention have been described that communicate audio/video data between a reader and a writer using ring buffer 101. However, an embodiment of the present invention is not limited to audio/video data. An embodiment of the present invention may be used to communicate any form of data, and particular any form of ordered data containing elements or items of data denoted, implicitly or explicitly, by ordinal information.

Hardware Overview

Figure 7:
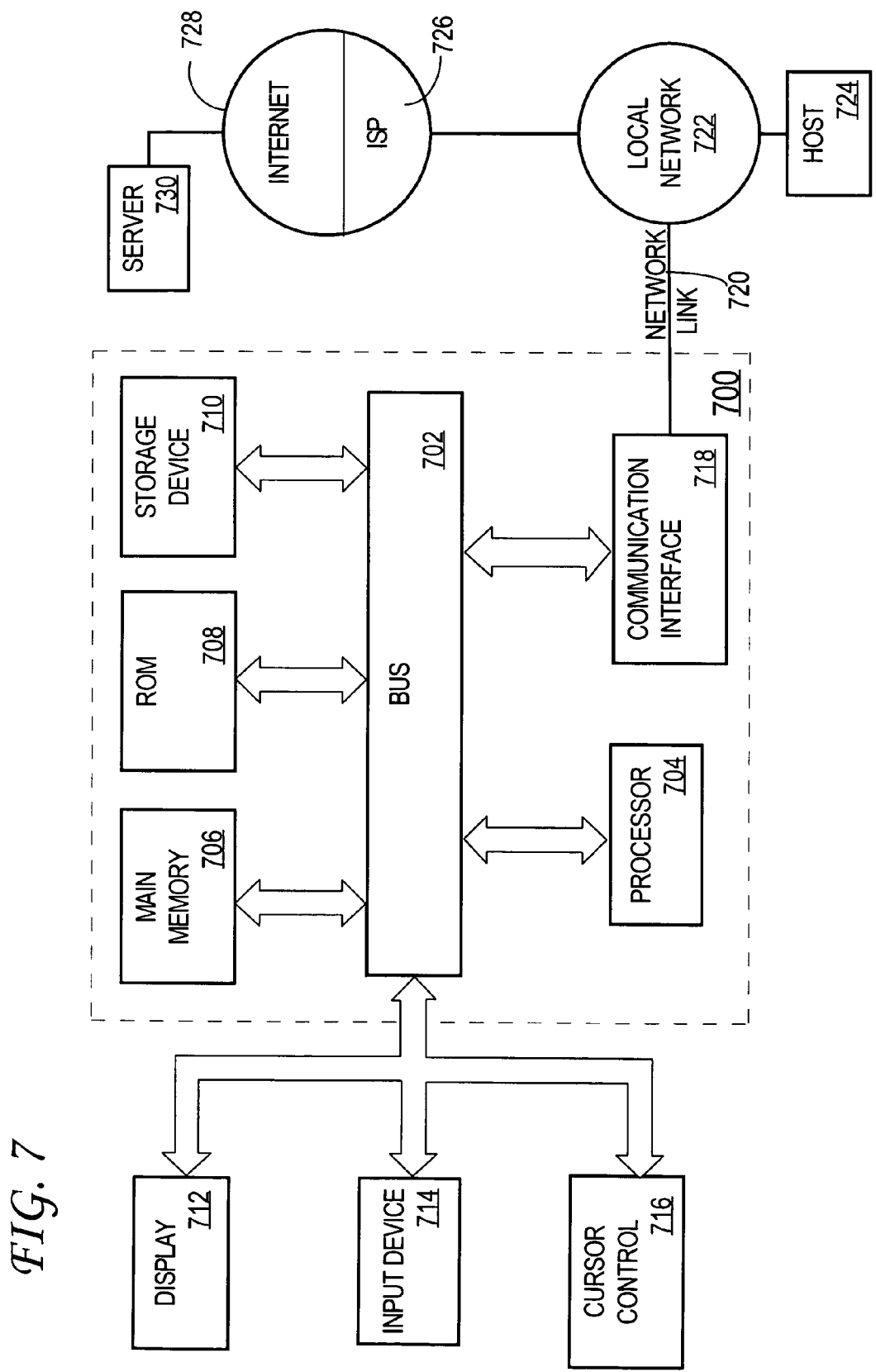
FIG. 7 is a block diagram illustrating a computer that may be used to implement an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for lockless access to a buffer, comprising the steps of:
   a computing device generating a set of elements, the set of elements comprising at least a first element, a second element, a third element, and a fourth element;
   wherein said first element comprises a next pointer that points to said second element and a nextfilled pointer that does not point to any particular location;
   wherein said second element comprises a next pointer that points to said third element;
   wherein said third element comprises a next pointer that points to said fourth element and a nextfilled pointer that does not point to any particular location;
   after a writer has finished writing to a buffer associated with said second element, the writer performing the steps of,
      determining whether the nextfilled pointer of the third element points to any particular location, and
      in response to determining that the nextfilled pointer of the third element does not point to any particular location, advancing to the third element and setting the nextfilled pointer of the first element to point to the second element;
   after a reader has finished reading from a buffer associated with the first element, the reader performing the steps of,
      determining whether the nextfilled pointer of the first element points to any particular location, and
      in response to determining that the nextfilled pointer of the first element points to a particular location, advancing to the second element and setting the nextfilled pointer of the first element to not point to any particular location.

2. The method of claim 1, wherein the step performed by the writer of determining whether the nextfilled pointer of the third element points to any particular location comprises determining whether the nextfilled pointer of the third element is set to NULL.

3. The method of claim 1, wherein the step performed by the reader of determining whether the nextfilled pointer of the first element points to any particular location comprises determining whether the nextfilled pointer of the first element is set to NULL.

4. The method of claim 1, wherein the step performed by the reader of setting the nextfilled pointer of the first element to not point to any particular location comprises setting the nextfilled pointer of the first element to NULL.

5. The method of claim 1, wherein the step performed by the writer of advancing to the third element is performed by the writer in response to the writer determining that the nextfilled pointer of the third element is set to NULL.

6. The method of claim 1, further comprising the steps of:
   generating a ring buffer comprising,
      a set of buffers for being filled by said writer and for being read by said reader, and
      said set of elements, wherein said set of elements are circularly ordered, each element of said set of elements being associated with a particular buffer from the set of buffers;
   wherein each element of said set of elements includes,
      a next pointer that points to a next element that follows in the circular order, and
      a nextfilled pointer that points to said next element only when the buffer associated with the next element can be read by the reader.

7. The method of claim 6, the steps further including:
   performing a read operation to return a quantity of data requested by the reader when data available in the ring buffer is less than the quantity of data; and
   returning, as part of said read operation, said quantity of data, said quantity of data including data not from said ring buffer.

8. The method of claim 7, wherein:
   said ring buffer holds ordered data denoted by ordinal information;
   said quantity of data corresponds to an ordinal position; and
   said data that is not from said ring buffer is returned as data that corresponds to said ordinal position.

9. The method of claim 8, wherein:
   said ring buffer holds audio/video data;
   said ordinal position covers a time period; and
   said data that is not from said ring buffer corresponds to a time period.

10. The method of claim 6, the steps further including:
    performing a read operation to return data that corresponds to a particular time specified by said reader; and
    as part of said read operation, returning a quantity of data as said data that corresponds to the particular time.

11. The method of claim 10, wherein:
    at least a portion of the data that corresponds to the particular time is not available in said ring buffer; and
    wherein the quantity of data includes data not from said ring buffer.

12. The method of claim 6, the steps further including:
    said writer writing certain data to said ring buffer;
    adding a plurality of elements to said ring buffer; and
    after adding said plurality of elements to said ring buffer, said reader reading said certain data from said ring buffer.

13. The method of claim 12, wherein the step of adding a plurality of elements is performed during a write operation.

14. The method of claim 6, the steps further including:
    said writer writing certain data to said ring buffer;
    removing at least one element from said ring buffer; and
    after removing said at least one element from said ring buffer, said reader reading said certain data from said ring buffer.

15. The method of claim 14, wherein said removing is performed during a write operation.

16. The method of claim 15, wherein:
    a series of elements is next to the first element based on the circular order; and
    said removing includes removing one or more elements of said series of elements having a nextfilled pointer set to NULL.

17. The method of claim 6 wherein said writer writes audio/video data to said set of buffers.

18. A computer-readable storage medium storing one or more sequences of instructions which, when executed by one or more processors, causes the one or more processors to perform the method recited in claim 1.

19. A computer-readable storage medium storing one or more sequences of instructions which, when executed by one or more processors, causes the one or more processors to perform the method recited in claim 2.

20. A computer-readable storage medium storing one or more sequences of instructions which, when executed by one or more processors, causes the one or more processors to perform the method recited in claim 3.

21. A computer-readable storage medium storing one or more sequences of instructions which, when executed by one or more processors, causes the one or more processors to perform the method recited in claim 4.

22. A computer-readable storage medium storing one or more sequences of instructions which, when executed by one or more processors, causes the one or more processors to perform the method recited in claim 5.

23. A computer-readable storage medium storing one or more sequences of instructions which, when executed by one or more processors, causes the one or more processors to perform the method recited in claim 6.

24. A computer-readable storage medium storing one or more sequences of instructions which, when executed by one or more processors, causes the one or more processors to perform the method recited in claim 7.

25. A computer-readable storage medium storing one or more sequences of instructions which, when executed by one or more processors, causes the one or more processors to perform the method recited in claim 9.

26. A computer-readable storage medium storing one or more sequences of instructions which, when executed by one or more processors, causes the one or more processors to perform the method recited in claim 10.

27. A computer-readable storage medium storing one or more sequences of instructions which, when executed by one or more processors, causes the one or more processors to perform the method recited in claim 11.

28. A computer-readable storage medium storing one or more sequences of instructions which, when executed by one or more processors, causes the one or more processors to perform the method recited in claim 12.

29. A computer-readable storage medium storing one or more sequences of instructions which, when executed by one or more processors, causes the one or more processors to perform the method recited in claim 13.

30. A computer-readable storage medium storing one or more sequences of instructions which, when executed by one or more processors, causes the one or more processors to perform the method recited in claim 14.

31. A computer-readable storage medium storing one or more sequences of instructions which, when executed by one or more processors, causes the one or more processors to perform the method recited in claim 15.

32. A computer-readable storage medium storing one or more sequences of instructions which, when executed by one or more processors, causes the one or more processors to perform the method recited in claim 16.

33. A computer-readable storage medium storing one or more sequences of instructions which, when executed by one or more processors, causes the one or more processors to perform the method recited in claim 17.

34. A computer-readable storage medium storing one or more sequences of instructions which, when executed by one or more processors, causes the one or more processors to perform the method recited in claim 8.

35. An computing device comprising:
one or more processors;
a writer and a reader;
a set of elements, the set of elements comprising at least a first element, a second element, a third element, and a fourth element; wherein the first element comprises a next pointer that points to said second element and a nextfilled pointer that does not point to any particular location; wherein the second element comprises a next pointer that points to said third element; wherein the third element comprises a next pointer that points to said fourth element and a nextfilled pointer that does not point to any particular location; and
logic encoded in one or more computer-readable media wherein execution by the one or more processors causes:
after the writer has finished writing to a buffer associated with said second element, the writer performing,
determining whether the nextfilled pointer of the third element points to any particular location, and
in response to determining that the nextfilled pointer of the third element does not point to any particular location, advancing to the third element and setting the nextfilled pointer of the first element to point to the second element;
after the reader has finished reading from a buffer associated with the first element, the reader performing,
determining whether the nextfilled pointer of the first element points to any particular location, and
in response to determining that the nextfilled pointer of the first element points to a particular location, advancing to the second element and setting the nextfilled pointer of the first element to not point to any particular location.

36. The computing device of claim 35, wherein the writer performing determining whether the nextfilled pointer of the third element points to any particular location comprises determining whether the nextfilled pointer of the third element is set to NULL.

37. The computing device of claim 35, wherein the reader performing determining whether the nextfilled pointer of the first element points to any particular location comprises determining whether the nextfilled pointer of the first element is set to NULL.

38. The computing device of claim 35, wherein reader performing setting the nextfilled pointer of the first element to not point to any particular location comprises setting the nextfilled pointer of the first element to NULL.

39. The computing device of claim 35, wherein the writer performing advancing to the third element is performed by the writer in response to the writer determining that the nextfilled pointer of the third element is set to NULL.

40. The computing device of claim 35, wherein the logic when executed further causes:
generating a ring buffer comprising,
a set of buffers for being filled by said writer and for being read by said reader, and
said set of elements, wherein said set of elements are circularly ordered, each element of said set of elements being associated with a particular buffer from the set of buffers;
wherein each element of said set of elements includes,
a next pointer that points to a next element that follows in the circular order, and
a nextfilled pointer that points to said next element only when the buffer associated with the next element can be read by the reader.

* * * * *

UNITED STATES PATENT AND TRADEMARK OFFICE
CERTIFICATE OF CORRECTION

PATENT NO.       : 7,620,753 B1                                          Page 1 of 1
APPLICATION NO.  : 11/083671
DATED            : November 17, 2009
INVENTOR(S)      : Beaman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1060 days.

Signed and Sealed this

Twenty-sixth Day of October, 2010

David J. Kappos
*Director of the United States Patent and Trademark Office*